(12) United States Patent
Rapoport et al.

(10) Patent No.: US 10,498,628 B2
(45) Date of Patent: Dec. 3, 2019

(54) ADAPTIVE METRIC COLLECTION, STORAGE, AND ALERT THRESHOLDS

(71) Applicant: NETFLIX, INC., Los Gatos, CA (US)

(72) Inventors: Roy Rapoport, Los Gatos, CA (US); Brent Pitman, Los Gatos, CA (US); Brian Harrington, Los Gatos, CA (US); Daniel Muino, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 389 days.

(21) Appl. No.: 15/425,905

(22) Filed: Feb. 6, 2017

(65) Prior Publication Data

US 2017/0149644 A1 May 25, 2017

Related U.S. Application Data

(62) Division of application No. 14/079,483, filed on Nov. 13, 2013, now Pat. No. 9,584,395.

(51) Int. Cl.
*G06F 15/173* (2006.01)
*H04L 12/26* (2006.01)
(Continued)

(52) U.S. Cl.
CPC ............ *H04L 43/16* (2013.01); *G06F 11/008* (2013.01); *G06F 11/076* (2013.01);
(Continued)

(58) Field of Classification Search
CPC ..... H04L 43/16; H04L 43/04; H04L 41/0681; H04L 41/147; G06F 11/008;
(Continued)

(56) References Cited

U.S. PATENT DOCUMENTS 7,621,445 B2 11/2009 Esseiva
8,612,402 B1 * 12/2013 Givargis ............... G06F 16/217
707/693

(Continued)

FOREIGN PATENT DOCUMENTS

| CN | 101853197 A | 10/2010 |
|---|---|---|
| CN | 102369731 A | 3/2012 |
| CN | 103178990 A | 6/2013 |

OTHER PUBLICATIONS

European Search Report Application No. 14192880.4, dated Apr. 15, 2016, 6 pages.

*Primary Examiner* — Philip B Tran
(74) *Attorney, Agent, or Firm* — Artegis Law Group, LLP

(57) ABSTRACT

Techniques for adaptive metric collection, metric storage, and alert thresholds are described. In an approach, a metric collector computer processes metrics as a collection of key/value pairs. The key/value pairs represent the dimensionality of the metrics and allows for semantic queries on the metrics based on keys. In an approach, a storage controller computer maintains a storage system with multiple storage tiers ranked by speed of access. The storage computer stores policy data that specifies the rules by which metric records are stored across the multiple storage tiers. Periodically, the storage computer moves database records to higher or lower tiers based on the policy data. In an approach, a metric collector in response to receiving a new metric, generates a predicted metric value based on previously recorded metric values and measures the deviation from the new metric value to determine whether an alert is appropriate.

10 Claims, 5 Drawing Sheets

(51) Int. Cl.
*G06F 11/00* (2006.01)
*G06F 11/07* (2006.01)
*G06F 11/34* (2006.01)
*G06F 11/32* (2006.01)
*H04L 12/24* (2006.01)

(52) U.S. Cl.
CPC ........ *G06F 11/0709* (2013.01); *G06F 11/328* (2013.01); *G06F 11/3409* (2013.01); *G06F 11/3452* (2013.01); *G06F 11/3476* (2013.01); *H04L 41/0681* (2013.01); *H04L 41/147* (2013.01); *H04L 43/04* (2013.01); *G06F 2201/81* (2013.01)

(58) Field of Classification Search
CPC .. G06F 11/0709; G06F 11/076; G06F 11/328; G06F 11/3409; G06F 11/3452; G06F 11/3476
USPC .................................................. 709/224, 223
See application file for complete search history.

(56) References Cited

U.S. PATENT DOCUMENTS

| | | |
|---|---|---|
| 8,918,586 B1 | 12/2014 | Todd |
| 9,003,157 B1 | 4/2015 | Marshak |
| 9,256,657 B1* | 2/2016 | Evenson ............... G06F 16/258 |
| 9,817,864 B1* | 11/2017 | Dunagan ................ G06F 11/30 |
| 2009/0271511 A1 | 10/2009 | Peracha |
| 2010/0153330 A1 | 6/2010 | Desikanhari |
| 2010/0238814 A1 | 9/2010 | Chen et al. |
| 2010/0274827 A1 | 10/2010 | Hix |
| 2011/0167217 A1 | 7/2011 | Montgomery |
| 2012/0110259 A1 | 5/2012 | Mills |
| 2012/0246157 A1* | 9/2012 | Theimer ................... G06F 8/77 707/736 |
| 2013/0103658 A1* | 4/2013 | Travis ................ G06F 16/2477 707/700 |
| 2013/0159502 A1 | 6/2013 | Thompson |
| 2013/0238791 A1* | 9/2013 | Anderson .......... G06F 11/3006 709/224 |
| 2014/0281322 A1 | 9/2014 | Martin |

* cited by examiner

ADAPTIVE METRIC COLLECTION, STORAGE, AND ALERT THRESHOLDS

BENEFIT CLAIM

This application claims the benefit under 35 U.S.C. § 120 as a divisional of application Ser. No. 14/079,483, filed Nov. 13, 2013, the entire contents of which are hereby incorporated by reference for all purposes as if fully set forth herein.

TECHNICAL FIELD

The present disclosure generally relates to aspects of metric collection and analysis, including adaptive metric storage and alert thresholds.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Metric collection is used in many different contexts. "Metric," in this context, refers to a data value representing a usage or performance characteristic of a computer, network, system or service. In some cases, metrics are used by system administrators to determine the health of a network. In other cases, metrics are used by advertisers to develop marketing strategies for specific demographics. However, conventional techniques related to metric collection, storage, and metric based alerts have significant limitations.

In the field of metric collection, prior metric collection techniques have utilized strings as the format for transporting metrics. However, performing search queries on strings typically requires expensive regular expression operations to be performed in order to obtain useful metric data. In the field of metric storage, businesses may grapple with the issue of how to efficiently store massive amounts of metric data using a finite set of resources. Typically, businesses perform data reduction to reduce the amount of data needed to be stored (and thus the cost of storage) by removing or merging older metrics. However, such techniques are inflexible and do not allow for the restoration of the older data in the event that the needs of users shifts over time. In the field of alert thresholds, network administrators develop systems that provide automatic notifications regarding potential problems in an operating environment based on metrics such as latency, dropped connections, refused requests, and so forth. However, conventional techniques, which utilize static absolute limits on the values of metrics, often generate false positives in certain situations. For example, a large number of requests received within a short time may signify that the network is experiencing a denial of service (DoS) attack. However, a hard threshold limit on the number of requests received causes false positives in the case where an event has occurred that generates a legitimate burst of activity. For example, if the business provides a streaming media service, the night a new blockbuster movie is put up on stream may cause a much higher stream of traffic than expected when the threshold was initially set, thus causing an alert generated for legitimate activity.

DETAILED DESCRIPTION

Figure 1:
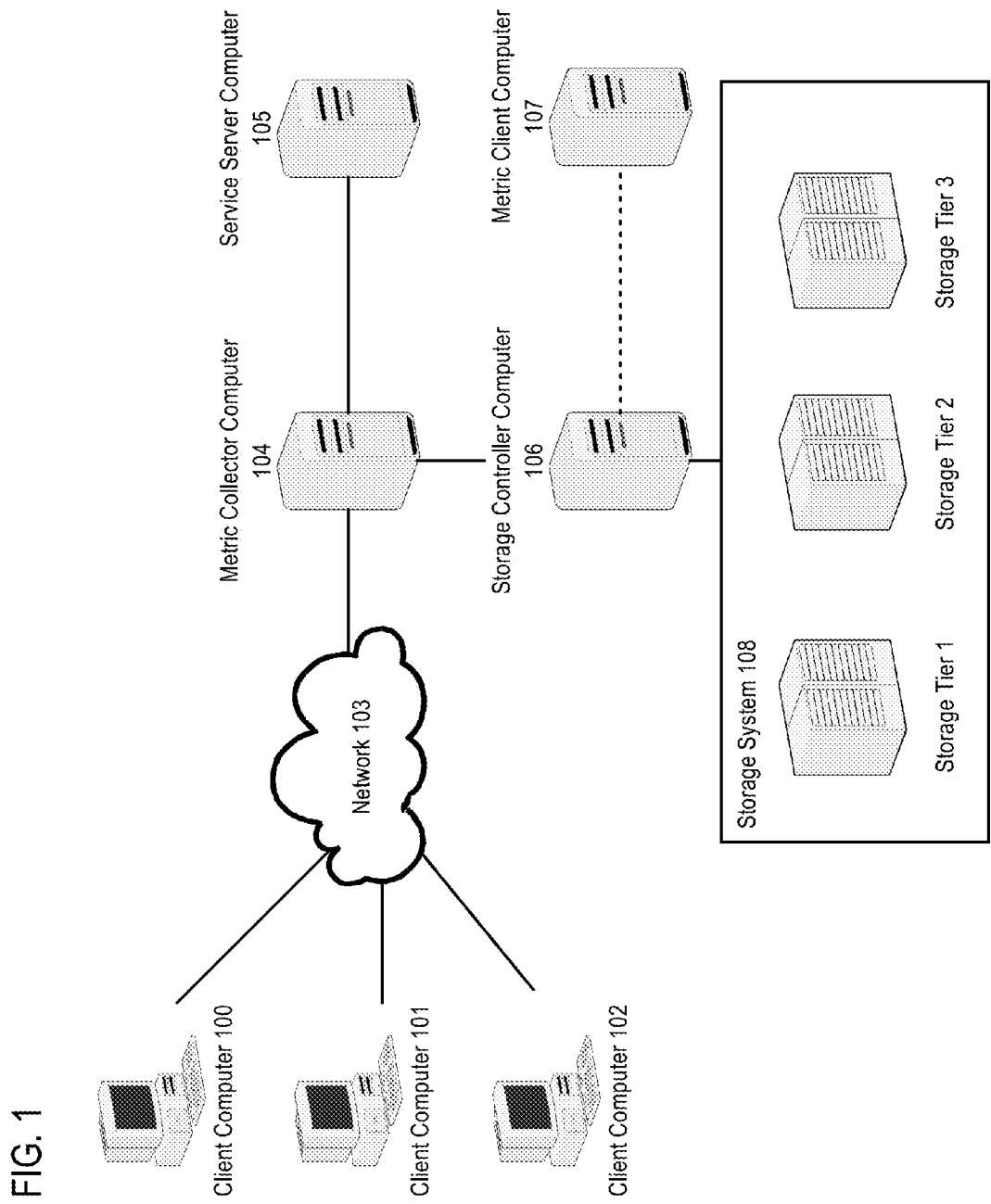
FIG. 1 illustrates an example operating environment upon which an embodiment may be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

For convince, the following description may make references to various communications such as "messages", "packets", "frames", "segments" belonging to different layers of the Open System Interconnection (OSI) model. However, mention of a particular type of communication in conjunction with a feature is not intended to limit the feature to only one layer of the OSI model. Thus, a feature discussed as applicable to one layer of the OSI model may also be applicable to other layers of the OSI model as well.

Embodiments are described herein according to the following outline:
 1.0 General Overview
 2.0 Example Operating Environment
 3.0 Metric Collection Overview
 4.0 Metric Storage Overview
 5.0 Adaptive Alert Threshold Overview
 6.0 Implementation Mechanisms—Hardware Overview
 7.0 Extensions and Alternatives
 1.0 General Overview As discussed above, transporting metrics as long strings may require regular expression analysis to be performed to execute queries for specific types of metrics. However, performing regular expression analysis can be fairly resource intensive. In an embodiment, a metric collector computer receives metrics from one or more clients in a record format, where the metric includes both a label and one or more key/value pairs. Thus, the label can be used to identify the type of metric that is being collected and the key/value pairs represent the dimensions or attributes of the metric. As a result, the metric collector computer can store, or cause a different element to store, the collected metric records in a storage system capable of being queried semantically based on the keys, which in most cases will be more efficient than regular expression analysis.

In an embodiment, a computer-implemented method comprises a metric collector computer receiving, from a client computer, a first metric record related to a request sent from the client computer to a service computer, wherein the first metric record includes a metric label and a plurality of key-value pairs. The metric collector computer causes the first metric record to be stored in a metric database containing a plurality of metric records for requests sent to the service server computer. The metric collector computer, a period of time after receiving the first metric record, receives a second metric record from the client computer, wherein the second metric record includes the metric label and one or more key-value pairs of the plurality of key-value pairs whose value has changed during the period of time and not one or more key-value pairs of the plurality of key-value pairs whose value has not changed during the period of time. The metric collector computer causes the second metric record to be stored in the metric database by at least automatically filling in the key-value pairs of the plurality of key-value pairs whose value has not changed during the period of time based on the first metric record stored in the metric database.

As discussed above, businesses will often try to reduce the amount of data stored for collected metrics by recording statistics related to groups of data points while removing those data points from storage. For example, by performing aggregation or consolidation on metrics after they have reached a particular age. However, the aforementioned approach can be inflexible and limit the types of queries that can be performed into the metric data. In an embodiment, the system storing the metrics are divided into multiple tiers which are ranked based upon speed of access. For example, a first storage tier may represent an active set that is kept entirely within memory, a second storage tier may represent a less frequently active set that is stored on a RAID of hard drive disks, and a third storage tier may represent archival storage, such as a collection of tape drives. A storage controller computer responsible for determining how metrics are stored across the storage tiers maintains policy data that comprises a set of rules indicating the actions to perform on metrics meeting certain criteria. Thus, for example, the storage controller computer may be configured to keep newer metrics on faster storage tiers and gradually downgrade the metrics to lower storage tiers over time. In some cases, users may only care about metric data points at a fine level of granularity when the information is new, but then require less exact data as the metric information becomes older. As a result, the storage controller computer may be configured to perform consolidation and/or aggregation on the metrics after a particular period of time, and then downgrade the base metric data to a lower storage tier. One advantage, in some embodiments, to the aforementioned tiered storage is that if the needs of the users change over time, the policy data stored on the storage controller computer can be updated causing the data stored across the individual tiers to shift or otherwise adhere to the new policy. Thus, if data for a particular period of time becomes of interest, the policy can be changed to create an exception that keeps that data in a higher storage tier and therefore be more easily accessible for queries. Furthermore, even if sought after metric data remains in the lower storage tier, the data remains accessible to user queries while still being stored in a resource efficient manner.

In an embodiment, a computer-implemented method comprises a storage controller computer storing a plurality of metric records in a storage system that comprises a plurality of storage tiers, wherein the storage tiers are ranked from highest to lowest. In response to a triggering event, the storage controller computer performs an aggregation operation or a consolidation operation on one or more metric records of the plurality of metric records stored in a particular storage tier of the plurality of storage tiers based on policy data, wherein the policy data specifies a set of operations and, for each operation in the set of operations, one or more criteria for metric records on which to perform the operation. The storage controller computer removes the one or more metric records from the particular storage tier and storing the one or more metric records on a lower storage tier of the plurality of storage tiers.

As discussed above, systems are often developed that use metrics as indicators of the health or proper functionality of components in an operating environment. However, using an absolute static threshold value for an alert can cause false positives due to the difficulty of estimating a proper limit. For example, if the operating environment provides a streaming video service a limit may be set to the value of a metric recorded during a week prior (estimating the limit by activity during the same day a week prior). However, if a new video is released the current week that generates a significant amount more activity compared to the previous week; the metric may well exceed the estimated limit without actually being indicative of an issue to which an administrator should be alerted. In an embodiment, a metric collector computer uses previously collected metrics as data points in a time series and computes a predicted value for the metric at the current time. The metric collector computer then compares the predicted value to a newly recorded metric value and determines if the deviation is beyond a particular threshold. If the threshold is exceeded, the metric collector computer generates an alert. Thus, an alert is only sounded when a collected metric value is sufficiently far off from the trend that the metric was following during the previous time periods. As a result, the threshold remains flexible based on recent trends, rather than adhering to a rigid absolute limit. However, in some embodiments, the techniques can also be combined, thus causing an alert to be generated if the metric value either passes a static absolute threshold or deviates sufficiently from a predicted value. For example, an administrator may desire an alert to be sounded if the number of requests approaches a level that the system is incapable of handling or if the number of requests deviates greatly from the number of predicted requests.

In an embodiment, a computer-implemented method comprises a metric collector computer storing previously collected metric values based on previous requests sent to a service server computer from one or more client computers during one or more previous periods of time. The metric collector computer, at a current period of time, receives a new metric value based on a request sent to the service server computer from a particular client computer. The metric collector computer performs regression on the previously collected metric values to determine a predicted metric value for the current period of time. In response to a determination that a deviation between the predicted metric value and the new metric value is greater than a specified threshold, the metric collector computer generates an alert.

In other embodiments, the invention encompasses a computer apparatus, a computer system, and a computer-readable medium configured to carry out the foregoing steps.

2.0 Example Operating Environment

FIG. 1 illustrates an example operating environment upon which an embodiment may be implemented. In FIG. 1, client computer 100, client computer 101, and client computer 102 (collectively referred to as "the clients") are communicatively coupled to the service server computer 105 over network 103. The metric collector computer 104 is configured as an intermediary between the clients and the service server computer 105. The metric collector computer 104 is communicatively coupled to storage controller computer 106. The storage controller computer 106 is communicatively coupled to a storage system 108 which contains storage tier 1, storage tier 2, and storage tier 3. In addition, the storage controller computer 106 is communicatively coupled to metric client computer 107.

Although FIG. 1 depicts only a particular number of elements, a practical environment may contain hundreds or thousands of each element. In addition, a practical environment may contain additional components which have been omitted from FIG. 1 to avoid obscuring the illustration. For example, the storage controller computer 106 may be communicatively coupled to the metric client computer 107 by network 103 or another network not depicted in FIG. 1. As another example, each computer may contain one or more software and/or hardware components, such as applications, processors, memory, etc. that are not explicitly depicted. Furthermore, a practical environment may combine the functionality of multiple elements into a single element or divide out the functionality of a single element into multiple elements. For example, the service server computer 105 may be configured to also perform tasks described in association with the metric collector computer 104. As another example, the functionality of the storage controller computer 106 may be divided into separate elements responsible for managing the storage system 108 and responding to queries from the metric client computer 107.

In an embodiment, the clients represent one or more computing devices, such as personal computers, workstations, laptops, netbooks, tablet computers, or smartphones. In an embodiment, the clients are configured to access a service from the service server computer 105. For example, if the service server computer 105 runs a web service, the clients may execute browser applications which send HTTP requests to the service server computer 105.

In an embodiment, network 103 represents any combination of one or more local networks, wide area networks, or internetworks. Data exchanged over the networks may be transferred using any number of network layer protocols, such as Internet Protocol (IP), Multiprotocol Label Switching (MPLS), Asynchronous Transfer Mode (ATM), and Frame Relay. Furthermore, in embodiments where the networks represent a combination of multiple sub-networks, different network layer protocols may be used at each of the underlying sub-networks.

In an embodiment, the metric collector computer 104 represents a computing device configured to collect metric information from the clients. In some embodiments, the metric collector computer 104 collects metrics passively by inspecting communications between the clients and the service server computer 105. For example, the metric collector computer 104 may monitor network metrics such as the latency of the communications, bandwidth of the communications, the number of packets sent and/or received during the communications, network address/port address used by the clients, and so forth. In addition, the metric collector computer 104 may collect metrics related to the clients themselves and/or the service requested by the clients. For example, the request and/or a response to the request may contain information, such as device type, country, state, type of request, success/failure of the request, user identification number, account identification number, user group, etc., which the metric collector computer 104 may collect as metrics.

In other embodiments, the metric collector computer 104 plays an active role in collecting metrics from the clients. For example, the metric collector computer 104 may periodically request information from the clients or the clients may be configured to periodically send information to the metric collector computer 104. In such embodiments, the clients may be configured to maintain a log identifying requests sent to the service server computer 105 and/or information pertaining to the outcome of the request. For example, assuming client computer 100 submitted a request to the service server computer 105 to activate an account, the client computer 100 may store a record in the log identifying the type of request, whether the request was successful, the device type of the client computer 100, country of origin, state of origin, etc. In some embodiments, the clients may be configured to send the metrics to the metric collector computer 104 in an asynchronous manner. For example, the clients may send the metrics to the metric collector computer in response to the service server computer 105 successfully or unsuccessfully responding to a request. In some embodiments, the metric collector computer 104 is configured to perform a combination of passive and active metric collection.

In an embodiment, the service server computer 105 represents a computing device configured to provide a service to the clients. For example, the service server computer 105 may represent a backend server running a streaming media service, an online gaming service, an advertising service, a web site, or any other type of service. The exact service provided by the service server computer 105 is not critical to the techniques described herein.

In an embodiment, the storage controller computer 106 represents a computing device configured to manage the storage and access of the recorded metrics. In this particular case, the storage controller computer 106 manages the storage and access of metrics stored in storage system 108. For example, the metric collector computer 104 may periodically transfer metrics collected from the clients to the storage controller computer 106. The storage controller computer 106 then determines how the information will be stored within the storage system 108 based on a storage policy. For example, the storage policy may specify criteria used by the storage controller computer 106 to determine which storage tier will be used to store the information. In an embodiment, the storage controller computer 106 is configured to respond to queries from the metric client computer 107 for information stored in the storage system 108. For example, the storage controller computer 106 may execute database software configured to store the metrics in the storage system 108 as an object-oriented or relational database. As a result, the metric client computer 107 may query for metrics by submitting a set of predicates which are used by the storage controller computer 106 to filter and return metrics stored in the storage system 108. In some embodiments, the storage controller computer 106 is configured to process the metrics before returning the metrics to the metric client computer 107. For example, the storage controller computer 106 may perform statistical operations, such determining the min, max, count, average, total value, etc. of the metrics depending on the query.

In an embodiment, the metric client computer 107 represents a computing device configured to query the storage controller computer 106 for metrics. For example, the metric client computer 107 may query for metrics adhering to any number of criteria, such as metrics pertaining to network performance, device type, request type, success or failure of the request, country of origin, state of origin, time period during which the request was received, etc.

In an embodiment, the storage system 108 represents a collection of storage devices upon which the storage controller computer 106 stores the collected metrics. In the embodiment depicted in FIG. 1, the storage system 108 is divided into storage tier 1, storage tier 2, and storage tier 3 (collectively referred to as "the storage tiers"). In an embodiment, the storage tiers are ranked according to the performance capabilities of each tier. For example, the storage tiers may be ranked according to speed of access. Thus, storage tier 1 may be comprised of fast and expensive storage devices for storing data expected to be accessed frequently, storage tier 2 may be comprised of medium quality storage devices for less active data, and storage tier 3 may be comprised of slow and inexpensive storage devices for long-term archived data. For example, storage tier 1 may comprise a RAID of fast hard drives, storage tier 2 may represent a RAID of less expensive and slower hard drives, and storage tier 3 may represent tape storage. Additionally or alternatively, the storage tiers may be ranked based at least partially on the number of devices available to service requests for data stored within each tier. For example, the storage tiers may be comprised of the same type of device, but higher tiers may possess more devices which can function in parallel to access data more quickly than lower tiers. In some embodiments, the storage tiers have the same performance capabilities, but are used to store metric data adhering to different sets of criteria. For the purpose of illustrating clear examples, the storage system 108 depicted in FIG. 1 possesses three storage tiers. However, the number of storage tiers that the storage system 108 contains is not critical to the techniques described herein.

3.0 Metric Collection Overview

Figure 2:
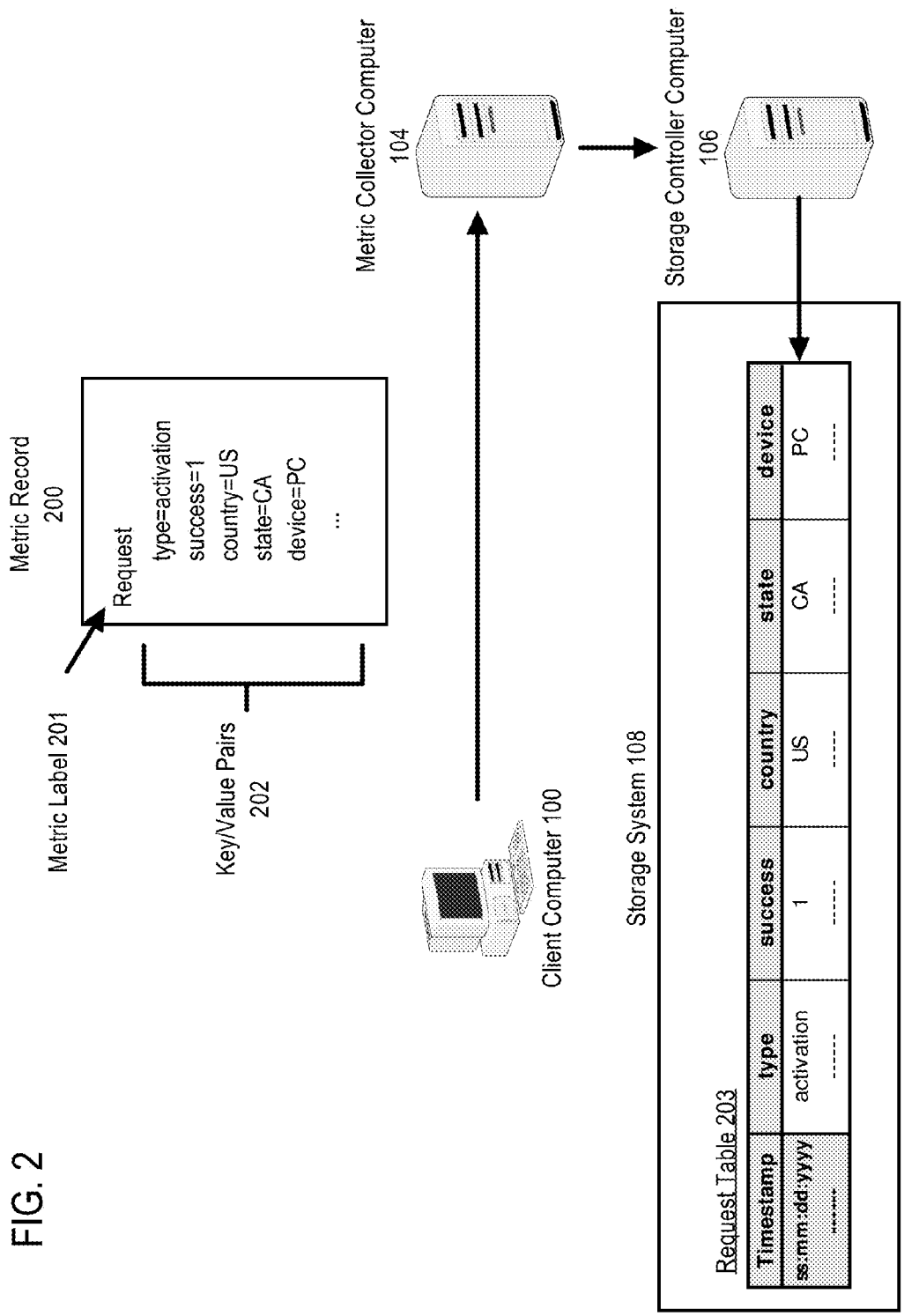
FIG. 2 illustrates an example process for collecting metrics according to an embodiment.

FIG. 2 illustrates an example process flow for metric collection according to an embodiment. For the purpose illustrating of clear examples, the process flow depicted in FIG. 2 will be described in reference to client computer 100. However, the same process flow can be used by any of the clients.

In FIG. 2, client computer 100 sends a metric record 200 to the metric collector computer 104 which contains information related to a request previously sent to the service server computer 105. The metric record 200 is identified by a metric label 201 and contains one or more key/value pairs 202. The metric label 201 identifies the context of the metric that is being requested and the key/value pairs 202 provide the details of the metric. In this case, the metric record 200 relates to a successful activation request sent from a PC in California, US. In FIG. 2, the metric collector computer 104 is assumed to play an active role in the collection of metrics. However, in embodiments where the metric collector computer 104 plays a passive role, the metrics that the metric collector computer 104 obtains by monitoring communications between the clients and the service server computer 105 can be processed into metric records of the substantially similar format as the metric record 200 depicted in FIG. 1.

In an embodiment, the metric collector computer 104 periodically sends the collected metrics to the storage controller computer 106. For example, the metric collector computer 104 may send batches of collected metrics every minute, hour, day, week, and so forth. In other embodiments, the metric collector computer 104 forwards records to the storage controller computer 106 in response to receiving each metric record 200 from the client computer 100. The storage controller computer 106 stores the metric record 200 received from the metric collector computer 104 in the storage system 108 based on a storage policy. An example storage process for storing a metric record 200 will be described in more detail below in the "Metric Storage Overview".

In an embodiment, the metric collector computer 104 stores the metric record 200 in the storage system 108 according to the principles of a relational database. In FIG. 2, the storage controller computer 106 stores the record in a request table 203 that corresponds to the metric label 201 of the metric record 200. For example, the request table 203 may contain columns which correspond to the keys of the key/value pairs 201 of the metric record 200. Thus, the storage controller computer 106 enters the metric record 200 by creating a new record in the request table 203 with values placed in the column representing the corresponding key. In some embodiments, the storage controller computer 106 adds additional information upon entering the metric record 200 into the storage system 108, such as a timestamp indicating when the metric record 200 was received. Alternatively, the timestamp may be added by the metric collector computer 104 into the metric record 200 upon receiving the metric record 200 from client computer 100. As yet another alternative, the client computer 100 may add a timestamp to the metric record 200 indicating the time when the request was sent and/or when a response to the request was received from the service server computer 105.

In an embodiment, the metric client computer 107 is configured to query the metrics stored in the storage system 108 by submitting a query to the storage controller computer 106 that specifies the metric label 201 which corresponds to as the name of the request table 203 and one or more predicates for columns of the request table 203 which correspond to the keys of the key/value pairs 202. In response, the storage controller computer 106 executes the query against the specified table in the storage system 108 by identifying records with column values which meet the predicates. The storage controller computer 106 then sends the identified records back to the metric client computer 107.

In some embodiments, the client computer 100 is configured to send key/value pairs 202 only for keys whose value has changed since the last time the client computer 100 reported the metrics to the metric collector computer 104. For example, the client computer 100 may initially send a metric record 200 containing all the key/value pairs 202 to the metric collector computer 104. However, the client computer 100 subsequently only include key/value pairs 202 in the metric record 200 that have been modified since the metrics were last reported. As a result, the client computer 100 may send a reduced set of key/value pairs 202 with the metric record 200 or skip the sending of the metric record 200 entirely. Then, depending on the embodiment, the metric collector computer 104 or the storage controller computer 106 may fill in the missing key/value fields or generate a metric record 200 using the values obtained from the previous time period for entry into the storage system 108. In some embodiments, as a space saving measure, the storage controller computer 106 may be configured to store as a column for each record in the request table 203 a collection of timestamps indicating the points in time associated with the collected metric values. Thus, in the event the metrics remain unchanged, the storage controller computer 106 adds another timestamp to the aforementioned column rather than adding another record with redundant information to the request table 203. Alternatively, the storage controller computer 106 may use a different format to store the list of timestamps, such as specifying a starting timestamp, an ending timestamp, length of the reporting period, and/or the number of reporting periods for which the collected metrics remained the same.

Although the storage system 108 is depicted as storing a table of a relational database in FIG. 2, the exact format used to store the metric record 200 in the storage system 108 is not critical to the techniques described herein. As a result, other embodiments may use an alternative storage format, such as flat files, an object-oriented database, or any other format for storing data.

4.0 Metric Storage Overview

Figure 3:
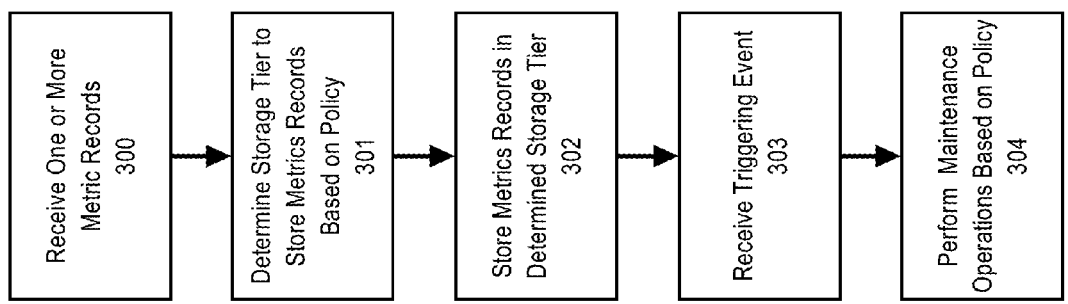
FIG. 3 illustrates an example process for storing metrics in block diagram form according to an embodiment.

FIG. 3 illustrates an example metric storage process in block diagram form according to an embodiment. For the purpose of illustrating clear examples, it will be assumed the process depicted in FIG. 3 is performed by the storage controller computer 106. In other embodiments, the steps depicted in FIG. 3 may be performed in a different order, divided out into multiple sub-steps, or merged into a smaller set of steps. For example, although block 303 is depicted as following block 302, block 303 is not necessarily performed in response to block 302 in every embodiment.

In FIG. 3, at block 300, the storage controller computer 106 receives one or more metric records. In some embodiments, the storage controller computer 106 receives the one or more metrics as a result of a report out by the metric collector computer 104. However, in other embodiments, the storage controller computer 106 may receive the metrics directly from the clients.

At block 301, the storage controller computer 106 determines which storage tiers within the storage system 108 to store the one or more metric records. In an embodiment, the storage controller computer 106 stores policy data that specifies the rules by which the storage controller computer 106 maintains data between storage tier 1, storage tier 2, and storage tier 3. Thus, the rules may specify that metric records pertaining to a particular metric label 201 or whose key/value pairs 202 meet a particular criteria should be stored in a particular storage tier. For example, metric records with a key/value pair designating "device=PC" may be stored initially in storage tier 2, whereas metric records with a key/value pair designating "device=mobile" may be stored initially in storage tier 1. In some embodiments, the storage controller computer 106 stores each metric record by default in storage tier 1. For example, the storage controller computer 106 may be configured to keep the most recent metric records in storage tier 1 and to over time migrate older metric records to lower storage tiers.

At block 302, the storage controller computer 106 stores the one or more metric records obtained at block 301 in their respective storage tiers. In some embodiments, the storage controller computer 106 stores each record in the storage devices represented by the determined storage tier. For example, the storage controller computer 106 may maintain an index in one of the storage tiers, such as storage tier 1, or maintain a local index that identifies the storage tier on which metric records meeting a particular type criteria is located. In some embodiments, the storage controller computer 106 may derive the storage tier for particular types of metric records by inspecting the policy data.

At block 303, the storage controller computer 106 receives a triggering event. In some embodiments, the triggering event is an event periodically generated by the storage controller computer 106 that begins maintenance of the storage system 108. In other embodiments, the triggering event may be in response to the storage controller computer 106 receiving an electronic communication. For example, the storage controller computer 106 may be configured to use the receiving of the metric records at block 300 as a triggering event or may receive a command from administrator via a user interface of the storage controller computer 106, the metric client computer 107, or an external administration computer (not depicted in FIG. 1). In some embodiments the storage controller computer 106 may be configured to use the detection of a storage device failure in a particular storage tier or a notification that a storage device will be taken offline as the triggering event for block 303.

At block 304, the storage controller computer 106 performs maintenance operations based on the policy data. In some embodiments, the policy data specifies one or more operations to be performed during maintenance and sets of criteria for each operation specifying the metric records to undergo the operation. For example, the policy data may specify that metric records associated with timestamps falling within a more recent time period should be kept in the current storage tier, whereas metric records associated with an older time period should be downgraded a tier. In an embodiment, the operations specified by the policy data include consolidation, aggregation, drop, or keep. Thus, the storage controller computer 106 may use criteria similar to the criteria discussed above in reference to block 301 to determine which operations to apply to which metric records. However, in some embodiments, the storage controller computer 106 may use criteria that do not involve the type of data stored in a metric record. In some embodiments, the storage controller computer 106 is configured to perform an operation on metric records in response to a determination that a device failure has occurred or that a particular storage device storing the metric records will be brought offline. For example, some businesses, in order to save on operating expenses, will run more storage devices within certain storage tiers during peak hours than off hours. As a result, when storage devices are taken offline, the metric records stored within those storage devices may need to be consolidated and/or aggregated when transferred to other storage devices or storage tiers.

In an embodiment, a consolidate operations specifies to change the granularity at which metric records are recorded in a given storage tier. For example, storage tier 1 may be configured to store metric records with a granularity of five minutes up to a period of a week, after which older metric records are stored with a granularity of an hour. When performing consolidation, the storage controller computer 106 identifies metric records which fall within the new period of granularity and merges those records. For example, the data points represented by the metric records which fall within a window of time based on the new granularity can be merged by computing the min, max, count, and total values of the key/value pairs 202 of those metric records and using those values as an estimate for the data points within the time window to consolidate. For key/value pairs 202 containing a non-numeric value, the aforementioned statistics may be computed based on a distribution of the values. For example, the min/max percentage of each value represented within the time window, the count of each value, and the collection of values found within the time window.

In an embodiment, an aggregation operation specifies to drop one or more keys from the key/value pairs 202 stored for the metric records. An alternative way to view an aggregation operation is a reduction in the dimensionality of the data. For example, assume the metric records are initially stored with the following keys—client identification number, device type, and latency. The policy data may specify that for metric records beyond a particular age that the exact client who contributed the data is no longer likely to be important for users of the metric client computer 107. As a result, the storage controller computer 106 removes the client identification number as a key for the metric records meeting the criteria and merges the records which were previously differentiated by that key. In some embodiments, the storage controller computer removes the key entirely from the merged metric records. However, in other embodiments, the storage controller computer may maintain statistics for the key which has been removed, such as min, max, count, total values similarly to merged records described above in relation to the consolidation operation.

In an embodiment, a drop operation removes metric records meeting the specified criteria from a particular storage tier. In some embodiments, the storage controller computer 106 is configured to respond to a drop operation by removing the specified records from the current storage tier and moving the dropped records to a lower storage tier. For example, the policy may specify that records collected within the last two days should be stored in storage tier 1, records collected within the last two weeks should be stored in storage tier 2, and older records should be stored in storage tier 3. As a result, the policy data can specify to drop data older than two days from storage tier 1, which results in the storage controller computer 106 moving the data to storage tier 2. In addition, the policy data can specify to drop data older than two weeks from storage tier 2, so that once the records pass the two week mark the records are then transferred to storage tier 3. However, in other embodiments, the drop operation may specify a specific storage tier for the dropped data, rather than by default moving the data to the next lower storage tier. In many cases, the criteria for a drop operation will overlap with a consolidation or aggregation operation. For example, after aggregation or consolidation is performed to create new merged data points, the storage controller computer 106 then removes the metric records corresponding to the old data points to another storage tier. As a result, the merged data remains available on the faster storage tiers and the older data can be efficiently maintained in the lower storage tiers while still being available for access.

In an embodiment, the keep operation specifies the metric records to keep in a given storage tier. While the storage controller computer 106 may be configured to keep metric records in the same storage tier by default unless there is an explicit drop operation, the keep operation allows for exceptions to be implemented to the drop operation. For example, metric records pertaining to certain important dates, such as a holiday, a major sporting event, a new release, etc. may represent metrics which are important to users of the metric client computer 107 regardless of age or other criteria. As a result, the keep operation overrides the drop operation with respect to the specified metric records. Thus, as a general policy, metric records older than two weeks may be moved to a lower storage tier, but with an exception that data on Thanksgiving Day will be maintained on the current storage tier. In some embodiments, the keep operation specifies the particular storage tier on which metric records meeting the criteria should be kept. As a result, during the performance of the maintenance operations, if the data referenced by the keep operation reside on a different storage tier, the storage controller computer 106 moves the metric records to the storage tier associated with the keep operation.

In some embodiments, the storage controller computer 106 is configured to receive instructions from the metric client computer 107 to change the rules specified in the policy data. For example, the metric client computer 107 may provide a graphical user interface that allows users to update the rules specified in the policy data of the storage controller computer 106. In some embodiments, the storage controller computer 106 is configured to use an update to the policy data as a triggering event for block 303. For example, users of the storage controller computer 106 may decide that metric records collected during a particular period of time are important after the metric records associated with that date have long since been moved to tier 3 archival storage. As a result, the change to the policy data may specify a keep operation for the aforementioned metric records that specifies to keep those records in storage tier 1. In response, the storage controller computer 106 performs operations which include identifying records within the specified time period and moving those records to storage tier 1.

5.0 Adaptive Alert Threshold Overview

Figure 4:
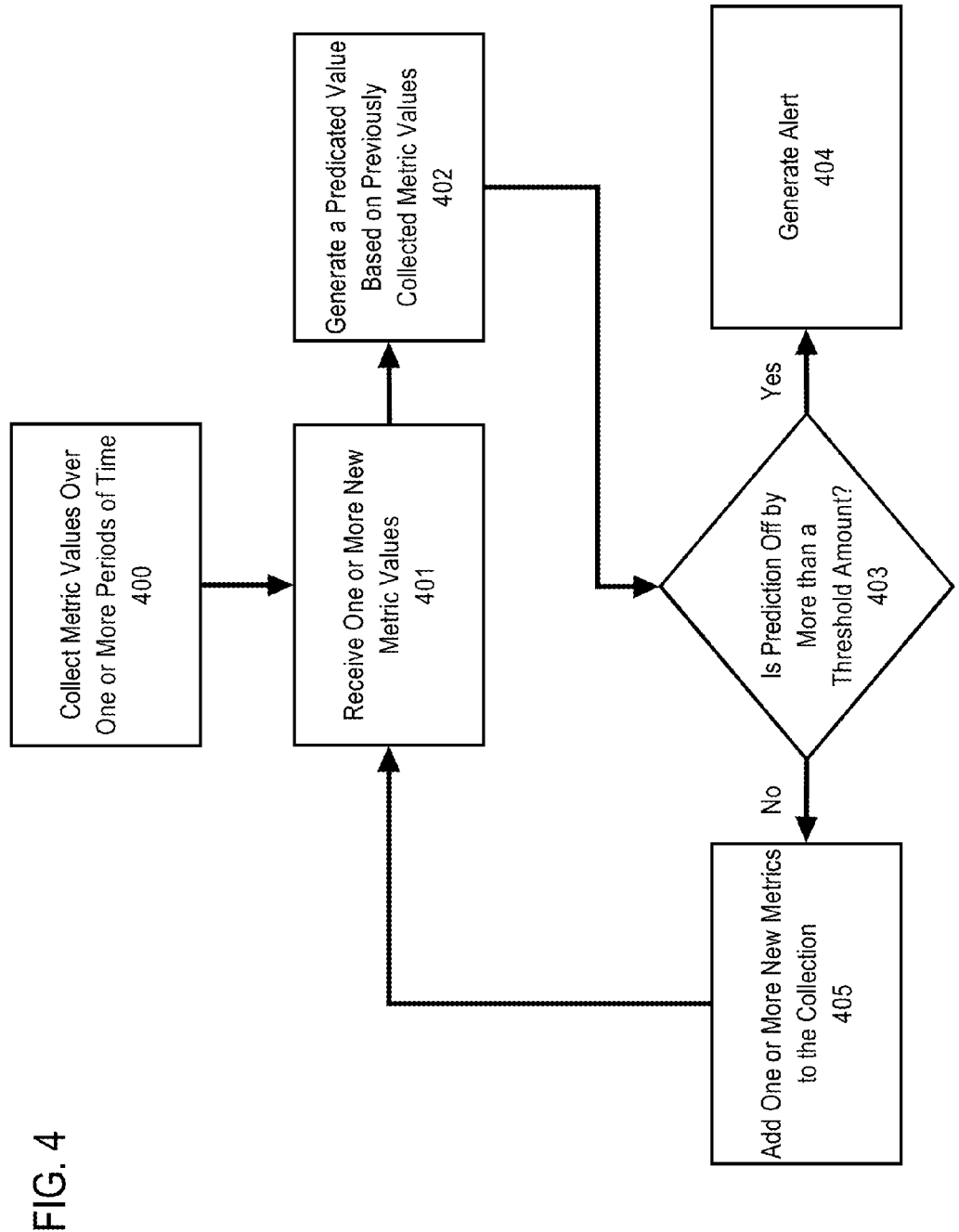
FIG. 4 illustrates an example process for using an adaptive alert threshold in block diagram form according to an embodiment.

FIG. 4 illustrates a process for using adaptive alert thresholds in block diagram form according to an embodiment. For the purpose of illustrating clear examples, it will be assumed that the process is performed by metric collector computer 104. However, in other embodiments, the process depicted in FIG. 4 may be performed by another component, such as storage controller computer 106. In still other embodiments, the process depicted in FIG. 4 may be partially performed by multiple different components. For example the storage controller computer 106 may supply metrics from the storage system 108 for the metric collector computer 104 to utilize when determining whether an alert should be generated. Furthermore, depending on the embodiment, the steps depicted in FIG. 4 may be performed in a different order, divided out into multiple sub-steps, or merged into a smaller set of steps.

In FIG. 4, at block 400, the metric collector computer 104 collects metric values related to communications between the clients and the service server computer 105 over one or more periods of time. The metric collected by the metric collector computer 104 at block 400 represents the metric monitored to determine whether an alert should be generated (hereinafter referred to as the "alert metric"). In some embodiments, the alert metric monitored at block 400 is chosen as representative of the activity or health of one or more components in the operating environment, such as the service server computer 105. As a result, significant deviations in the value of the alert metric compared to previously recorded values may indicate an operating problem to which an administrator should be alerted. For example, the metric collector computer 104 may collect metrics such as the average latency between the clients and the service server computer 105, the ratio of successfully performed requests vs. unsuccessfully performed requests, total number of requests, distribution of the geographical areas of the clients, etc. over one or more periods of time. However, the exact metric monitored by the metric collector computer 104 is not critical to the techniques described herein. Furthermore, in some embodiments, the metric collector computer 104 may base an alert on multiple metrics or may maintain multiple individual alerts based on different metrics.

In some embodiments, the metric collector computer 104 stores configuration data that specifies the rules for when an alert should be generated. For example, the configuration data may indicate one or more threshold values for the alert metric, the mathematical function used to predict values of the alert metric based on previously recorded values, or even the type of metric that is being monitored for the alert. Thus, in embodiments where the collector computer 104 periodically sends metrics to the storage controller computer 106 for storage in the storage system 108, block 400 may be replaced with a step in which the metric collector computer 104 queries the storage controller computer 106 for the metric values specified in the configuration data. As a result, by updating the configuration data, it is possible change the rules by which the metric collector computer 104 generates an alert on the fly, allowing for flexibility without the need to exhaustively store every type of metric on the metric collector computer 104.

At block 401, the metric collector computer 104 receives one or more new metric values for the alert metric. In some embodiments, the metric collector computer 104 receives the one or more new metric values from the clients as a result of a periodic report. An example of a report process that can be used for this purpose is depicted in FIG. 2 and discussed above in the Metric Collection Overview. For example, the metric values collected at block 400 may represent previous report periods during which metric values were collected from the clients and the new metric values collected at block 401 may represent the metric value(s) collected during the current reporting period. In some embodiments, the reporting of metrics from the clients to the metric collector computer 104 is asynchronous. As a result, the previously collected metric values at block 400 may represent individual data points, rather previous periods or intervals of time. The following examples will use the term "time period" or "reporting period", but the techniques are equally applicable to both embodiments.

At block 402, the metric collector computer 104 generates a predicted value based on the metric values previously collected at block 400. In an embodiment, the metric collector computer 104 treats the metric values collected over the previous one or more time periods as a time series and applies a predictive mathematical function to generate a predicted value for the current reporting period. For example, the metric collector computer 104 may apply double exponential smoothing, exponential weighted average, or any other type of regressive analytic technique. The exact function used to generate the predicted value for the current reporting period is not critical to the techniques described herein.

At block 403, the metric collector computer 104 determines whether the one or more new metric values received at block 401 falls within a threshold deviation from the value predicted at block 402. In some embodiments, the metric collector computer 104 maintains a static threshold, such as 10% deviation, 20% deviation, 50% deviation, etc. for the alert metric. In other embodiments, the threshold may be dynamic. For example, the metric collector computer 104 may be configured to use a higher percentage when the metric values collected at block 400 have a high level of noise and a lower percentage when the noise level is lower. In the event that the one or more new metric values does not fall within the specified threshold of the predicted value, the metric collector computer 104 proceeds to block 404 to generate an alert. Otherwise, the metric collector computer 104 proceeds to block 405. In some embodiments, the metric collector computer 104 also uses an absolute threshold for the alert metric in addition to a threshold based on the predicted value in order to catch cases where the metric slowly deviates beyond an unacceptable boundary. For example, if the latency between the clients and the service server computer 105 becomes greater than a particular value, the metric collector computer 104 may generate an alert, even if the alert metric is still within acceptable bounds of the predicted value.

At block 404, the metric collector computer 104 generates an alert. In some embodiments, the metric collector computer 104 generates an alert by informing an administrator or other interested party of the discrepancy. For example, the metric collector computer 104 may send an email, instant message, tweet, or any other type of electronic communication to an account held by the administrator. In some embodiments, the communication includes a description of the alert metric, the predicted value, the value for the current reporting period, and a representation of the metric collected at block 400. For example, the metric collector computer 104 may send the administrator's account a document, such as an HTML document, which when rendered by an application of the administrator's computer, displays a graph showing the previously collected values and current value as data points over one or more periods of time, and a line illustrating the regression sued at block 403 applied to the data points of the graph. As a result, the deviation of the current value of the alert metric and the predicted value becomes apparent by visual inspection. In other embodiments, the data may be presented in other formats, such as a flat file or a table.

At block 405, the metric collector computer 104 adds the one or more metric values received at block 401 to the metric values collected at block 400. As a result, the collection includes metric values for up to and including the current reporting period. In some embodiments, the metric collector computer 104 may set a limit on the reporting periods included in the collection. For example, the metric collector computer 104 may remove metric values collected from periods beyond a particular time limit or number of reporting period represented in the collection. The metric collector computer 104 than waits until new metric values for the next reporting period are received at block 401 and repeats the process of determining whether an alert should be generated. In embodiments where the metric collector computer 104 queries the storage controller computer 106 for the metrics at block 400, the metric collector computer 104 may enforce the limits by only querying for metric values for time periods within the specified limit. In addition, the addition of the metric values at block 405 may be performed during the course of sending periodic batches of metric records to the storage controller computer 106 as described previously in the Metric Collection Overview.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
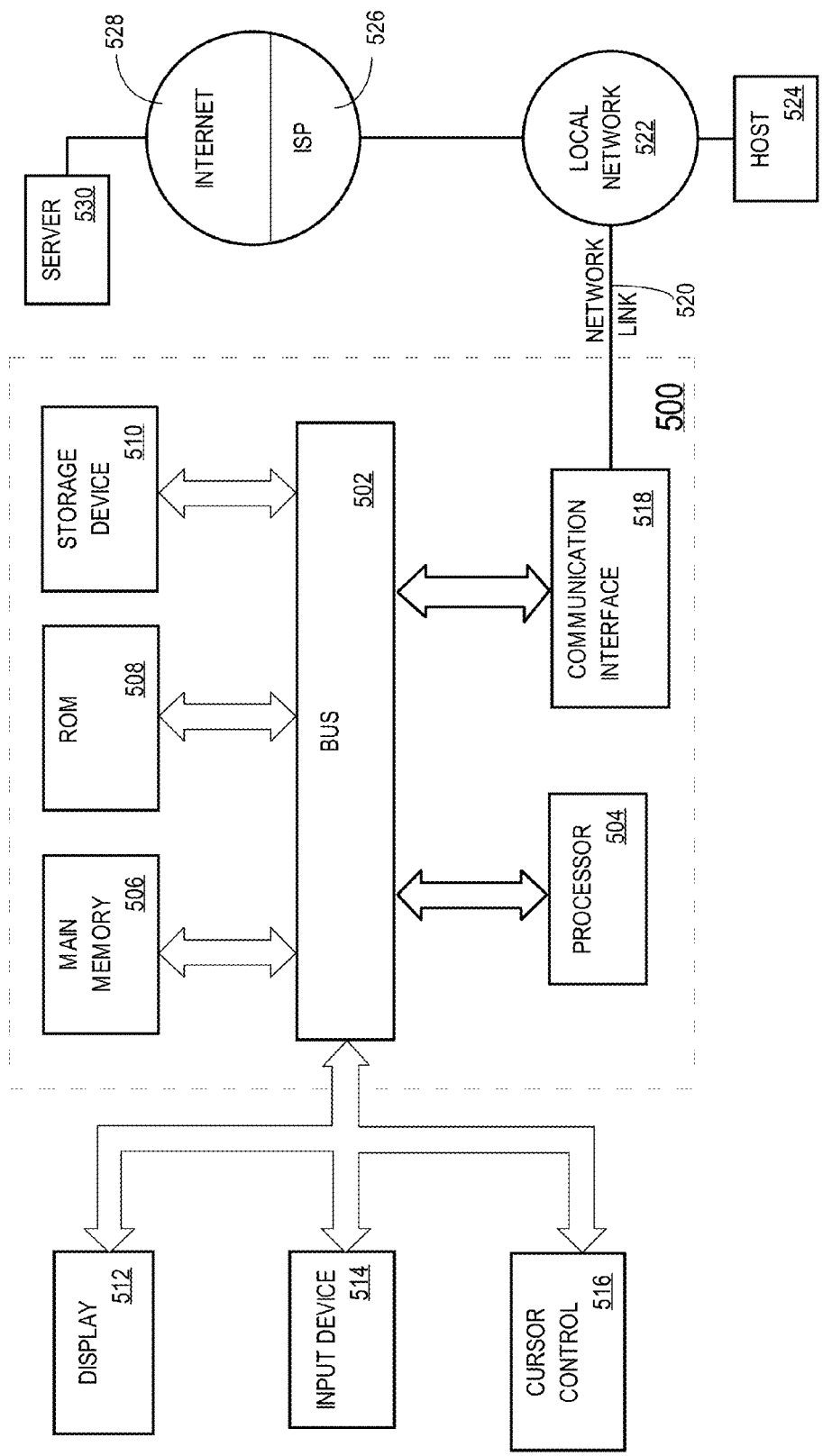
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
a metric collector computer receiving from, a client computer, a first metric record related to a request sent from the client computer to a service computer, wherein the first metric record includes a metric label and a plurality of key-value pairs;
the metric collector computer causing the first metric record to be stored in a metric database containing a plurality of metric records for requests sent to the service computer;
the metric collector computer, a period of time after receiving the first metric record, receiving, from the client computer, a second metric record, wherein the second metric record includes the metric label and one or more key-value pairs of the plurality of key-value pairs whose value has changed during the period of time and not one or more key-value pairs of the plurality of key-value pairs whose value has not changed during the period of time; and
the metric collector computer causing the second metric record to be stored in the metric database by at least automatically filling in the key-value pairs of the plurality of key-value pairs whose value has not changed during the period of time based on the first metric record stored in the metric database.

2. The method of claim 1, wherein the plurality of key-value pairs relate to any one or more of: user identification number, device identification number, geographical area, latency, bandwidth, success or failure of the request, time to complete the request, device type, a timestamp, or type of request.

3. The method of claim 1, wherein the metric collector computer causing the first metric record and the second metric record to be stored in the metric database comprises periodically sending collected metric records, including the first metric record and the second metric record, to a storage controller computer for entry into the metric database.

4. The method of claim 3, further comprising the storage controller computing receiving, from a metric client computer, a query for particular metric records including one or more key-value pairs which meet one or more particular criteria, identifying the particular metric records, and sending the particular metric records to the metric client computer.

5. The method of claim 1, wherein the metric database represents one or more of a relational database, a flat file database, or an object-oriented database.

6. A non-transitory computer-readable medium storing one or more instructions which, when executed by one or more processors, cause the one or more processors to perform steps comprising:
a metric collector computer receiving from, a client computer, a first metric record related to a request sent from the client computer to a service computer, wherein the first metric record includes a metric label and a plurality of key-value pairs;
the metric collector computer causing the first metric record to be stored in a metric database containing a plurality of metric records for requests sent to the service computer;
the metric collector computer, a period of time after receiving the first metric record, receiving, from the client computer, a second metric record, wherein the second metric record includes the metric label and one or more key-value pairs of the plurality of key-value pairs whose value has changed during the period of time and not one or more key-value pairs of the plurality of key-value pairs whose value has not changed during the period of time; and
the metric collector computer causing the second metric record to be stored in the metric database by at least automatically filling in the key-value pairs of the plurality of key-value pairs whose value has not changed during the period of time based on the first metric record stored in the metric database.

7. The non-transitory computer-readable medium of claim 6, wherein the plurality of key-value pairs relate to any one or more of: user identification number, device identification number, geographical area, latency, bandwidth, success or failure of the request, time to complete the request, device type, a timestamp, or type of request.

8. The non-transitory computer-readable medium of claim 6, wherein the metric collector computer causing the first metric record and the second metric record to be stored in the metric database comprises periodically sending collected metric records, including the first metric record and the second metric record, to a storage controller computer for entry into the metric database.

9. The non-transitory computer-readable medium of claim 8, wherein the steps further comprise the storage controller computing receiving, from a metric client computer, a query for particular metric records including one or more key-value pairs which meet one or more particular criteria, identifying the particular metric records, and sending the particular metric records to the metric client computer.

10. The non-transitory computer-readable medium of claim 6, wherein the metric database represents one or more of a relational database, a flat file database, or an object-oriented database.

* * * * *